(12) United States Patent
Gao et al.

(10) Patent No.: US 12,184,374 B2
(45) Date of Patent: *Dec. 31, 2024

(54) CHANNEL STATE INFORMATION REPORTING METHOD AND DEVICE, AND CHANNEL STATE INFORMATION RECEIVING METHOD AND DEVICE

(71) Applicant: ZTE CORPORATION, Guangdong (CN)

(72) Inventors: Bo Gao, Guangdong (CN); Yu Ngok Li, Guangdong (CN); Zhaohua Lu, Guangdong (CN); Chuangxin Jiang, Guangdong (CN); Hao Wu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/229,711

(22) Filed: Aug. 3, 2023

(65) Prior Publication Data
US 2023/0379028 A1     Nov. 23, 2023

Related U.S. Application Data

(63) Continuation of application No. 17/046,866, filed as application No. PCT/CN2019/082228 on Apr. 11, 2019, now Pat. No. 11,764,846.

(30) Foreign Application Priority Data

Apr. 12, 2018    (CN) .................... 201810327468.X

(51) Int. Cl.
*H04B 7/06*      (2006.01)
*H04B 7/0456*    (2017.01)
(Continued)

(52) U.S. Cl.
CPC ......... *H04B 7/0626* (2013.01); *H04B 7/0486* (2013.01); *H04B 7/0639* (2013.01); *H04L 1/1614* (2013.01); *H04L 5/0051* (2013.01)

(58) Field of Classification Search
None
See application file for complete search history.

(56) References Cited

U.S. PATENT DOCUMENTS

| 10,630,366 | B2 * | 4/2020 | Cha ........................... H04L 5/00 |
| 11,317,306 | B2 * | 4/2022 | Wei ...................... H04B 7/0647 |

(Continued)

*Primary Examiner* — Otis L Thompson, Jr.
(74) *Attorney, Agent, or Firm* — KDW Firm PLLC

(57) ABSTRACT

Provided are channel state information reporting method and apparatus, and channel state information receiving method and apparatus. The channel state information reporting method includes: receiving a reference signal sent by a second communication node; and determining, according to a first type reporting configuration signaling associated with the reference signal, at least one of a first type channel state information set or a second type channel state information set, and reporting the at least one of the first type channel state information set or the second type channel state information set to the second communication node. The first type channel state information set includes at least one of a reference signal resource index, a reference signal resource set index, a reference signal resource setting index, a reporting configuration index, a reference signal port group index, a reference signal port group set index, a port index, or rank indicator information. The second type channel state information set comprises at least one of precoding matrix indicator information, channel quality indicator information, an amplitude coefficient, a phase coefficient, or a reference signal received power.

16 Claims, 5 Drawing Sheets

---

Receive a reference signal sent by a second communication node — S101

Determine, according to a first-class reporting configuration signaling associated with the reference signal, at least one of a first-class channel state information set or a second-class channel state information set, and report the at least one of a first-class channel state information set or a second-class channel state information set to the second communication node — S102

(51) Int. Cl.
 *H04L 1/1607* (2023.01)
 *H04L 5/00* (2006.01)

(56) References Cited

U.S. PATENT DOCUMENTS

| | | | |
|---|---|---|---|
| 2018/0278301 A1* | 9/2018 | Kim | H04B 7/046 |
| 2019/0207662 A1* | 7/2019 | Zhou | H04W 72/0446 |
| 2019/0356439 A1* | 11/2019 | Lee | H04L 5/0048 |
| 2020/0099432 A1* | 3/2020 | Määttanen | H04B 7/0617 |
| 2020/0177254 A1* | 6/2020 | Lee | H04W 76/27 |

* cited by examiner

CHANNEL STATE INFORMATION REPORTING METHOD AND DEVICE, AND CHANNEL STATE INFORMATION RECEIVING METHOD AND DEVICE

This is a Continuation application of U.S. patent application Ser. No. 17/046,866, filed on Oct. 12, 2020, which is a U.S. National Stage Application of International Patent Application No. PCT/CN2019/082228, filed on Apr. 11, 2019, which claims priority to Chinese patent application No. 201810327468.X filed with the China National Intellectual Property Administration (CNIPA) on Apr. 12, 2018, disclosures of which are incorporated herein by reference in their entireties.

TECHNICAL FIELD

The present application relates to the technical field of communication transmission and, in particular, to a channel state information reporting method and a channel state information reporting apparatus, and a channel state information receiving method and a channel state information receiving apparatus.

BACKGROUND

The high frequency band with ultra wide bandwidth (i.e., millimeter wave communication) becomes an important developing direction of mobile communication in the future and attracts the attention of academia circles and industrial circles across the world. Particularly, the advantages of millimeter waves become more and more attractive with increasingly congested spectrum resources and a huge number of accesses to physical networks in the present. Standardization has been started in many standards organizations such as the Institute of Electrical and Electronics Engineers (IEEE) and the 3rd Generation Partnership Project (3GPP). For example, in the 3GPP standards organization, high frequency band communication, thanks to its significant advantage of wide bandwidth, may become an important innovation point of 5G new radio access technology (5G New RAT).

However, the high frequency band communication is also up against challenges of link attenuation, for example, propagation path loss is great, air absorption (especially oxygen absorption) is larger, and rain attenuation is severe. In view of these challenges, a high frequency band communication system may acquire high antenna gains and resist signal transmission losses by means of a multi-antenna array and beamforming using characteristics such as short wavelength and easy antenna integration of the high frequency band, thereby ensuring a link budget and improving communication robustness.

In a training process of antenna weights (also referred to as precoding or beams), a high frequency band transmitter transmits a training pilot, and a receiver receives channels and performs channel estimation. Then the high frequency band receiver needs to feed back channel state information to a training transmitter, so that the transmitter and the receiver may select, from optional antenna weight pairs of the transmitter and the receiver, multiple groups of antenna weight pairs of the transmitter and the receiver which may be used for multi-path data transmission to improve overall spectrum efficiency.

In an existing 5G communication system, channel state information feedback related to analog beams and channel state information feedback related to digital beams are independently decoupled. However, considering that analog beam feedback is only based on the received signal strength and cannot consider self-interference and mutual-interference, it is difficult for actual feedback analog beams to acquire a globally optimal combination solution after combining with the digital beams. In the existing art, there is no solution to support the joint reporting of channel state information related to analog domain and digital domain under scenarios of multiple base stations (or multiple transmission points (TRPs)) and multiple panels.

SUMMARY

The present application provides a channel state information reporting method and a channel state information reporting apparatus, and a channel state information receiving method and a channel state information receiving apparatus, and provides a solution for jointly reporting channel state information under the condition that analog domain and digital domain are mixed.

To achieve the above-mentioned object, the present application adopts the following solutions.

In a first aspect, the present application provides a channel state information reporting method applied to a first communication node. The method includes: receiving a reference signal sent by a second communication node; and determining, according to a first type reporting configuration signaling associated with the reference signal, at least one of a first type channel state information set or a second type channel state information set, and reporting the at least one of the first type channel state information set or the second type channel state information set to the second communication node.

The first type channel state information set includes at least one of a reference signal resource index, a reference signal resource set index, a reference signal resource setting index, a reporting configuration index, a reference signal port group index, a reference signal port group set index, a port index, or rank indicator information.

The second type channel state information set includes at least one of precoding matrix indicator information, channel quality indicator information, an amplitude coefficient, a phase coefficient, or a reference signal received power.

Optionally, the reference signal includes N reference signal resource settings, one of the N reference signal resource setting includes M reference signal resource sets, one of the M reference signal resource sets includes K reference signal resources, and one of the K reference signal resources includes L reference signal ports.

N, M, K and L are integers greater than or equal to 1.

Optionally, the at least one of the first type channel state information set or the second type channel state information set reported to the second communication node includes at least one of the following:

the first type channel state information set includes I first type state information subsets, one first type state information subset includes at least one of: the reference signal resource index, the reference signal resource set index, the reference signal resource setting index, the reporting configuration index, the reference signal port group index, the reference signal port group set index, the port index, or the rank indicator information; or the second type channel state information set includes J second type state information subsets, one second type state information subset includes at least one of the precoding matrix indicator information, the channel quality indicator information, the amplitude coefficient, the phase coefficient, or the reference signal received power.

I and J are integers greater than or equal to 1.

Optionally, the first type channel state information set further includes a wideband parameter or a partial-band parameter.

Optionally, the first type channel state information set includes at least one of: reference signal resource set indexes whose quantity is A0, reference signal resource indexes whose quantity is A1, or reference signal port group indexes whose quantity is A2.

A0, A1 and A2 are integers greater than or equal to 0.

Optionally, the first type reporting configuration signaling configures one of following parameters: A0, A1 or A2.

Optionally, the first type channel state information set includes at least one of: reference signal resource set indexes whose quantity is at most B0 or reference signal resource set indexes whose quantity is not less than C0, reference signal resource indexes whose quantity is at most B1 or reference signal resource indexes whose quantity is not less than C1, or reference signal port group indexes whose quantity is at most B2 or reference signal port group indexes whose quantity is not less than C2.

B0, C0, B1, C1, B2 and C2 are integers greater than or equal to 0.

Optionally, the first type reporting configuration signaling configures at least one of following parameters: B0, C0, B1, C1, B2 or C2.

Optionally, the at least one of the first type channel state information set or the second type channel state information set is reported to the second communication node according to at least one of the following rules:
  under different reference signal resource settings, reporting port indexes, reference signal port group indexes, reference signal port group set indexes, reference signal resource indexes, or reference signal resource set indexes; or
  under a same reference signal resource setting, reporting no more than U0 or U0 reference signal port indexes, no more than U1 or U1 reference signal port group indexes, no more than U2 or U2 reference signal port group set indexes, no more than U3 or U3 reference signal resource indexes, or no more than U4 or U4 reference signal resource set indexes;
  where U0, U1, U2, U3 and U4 are integers greater than or equal to 1.

Optionally, the first type reporting configuration signaling configures at least one of following parameters: U0, U1, U2, U3 or U4.

Optionally, the at least one of the first type channel state information set or the second type channel state information set is reported to the second communication node according to at least one of the following rules:
  only reporting port indexes, reference signal port group indexes, reference signal port group set indexes, reference signal resource indexes, or reference signal resource set indexes under a same reference signal resource setting; or
  precluding reporting port indexes, reference signal port group indexes, reference signal port group set indexes, reference signal resource indexes, or reference signal resource set indexes under different reference signal resource settings.

Optionally, the at least one of the first type channel state information set or the second type channel state information set is reported to the second communication node according to at least one of the following rules:
  under different reference signal resource sets, reporting port indexes, reference signal port group indexes, reference signal port group set indexes, or reference signal resource indexes; or
  under a same reference signal resource set, reporting no more than V0 or V0 reference signal port indexes, no more than V1 or V1 reference signal port group indexes, no more than V2 or V2 reference signal port group set indexes, or no more than V3 or V3 reference signal resource indexes;
  wherein V0, V1, V2 and V3 are integers greater than or equal to 1.

Optionally, the first type reporting configuration signaling configures at least one of following parameters: V0, V1, V2 or V3.

Optionally, the at least one of the first type channel state information set or the second type channel state information set is reported to the second communication node according to at least one of the following rules:
  only reporting port indexes, reference signal port group indexes, reference signal port group set indexes, or reference signal resource indexes under a same reference signal resource set; or
  precluding reporting port indexes, reference signal port group indexes, reference signal port group set indexes, or reference signal resource indexes under different reference signal resource sets.

Optionally, the at least one of the first type channel state information set or the second type channel state information set is reported to the second communication node according to at least one of the following rules:
  under different reference signal resources, reporting port indexes, reference signal port group indexes, or reference signal port group set indexes; or
  under a same reference signal resource, reporting no more than W0 or W0 reference signal port indexes, no more than W1 or W1 reference signal port group indexes, or no more than S1 or S1 reference signal port group set indexes;
  wherein W0, W1 and S1 are integers greater than or equal to 1.

Optionally, the first type reporting configuration signaling configures at least one of following parameters: W0, W1 or S1.

Optionally, the at least one of the first type channel state information set or the second type channel state information set is reported to the second communication node according to at least one of the following rules:
  only reporting port indexes, reference signal port group indexes, or reference signal port group set indexes under a same reference signal resource; or
  precluding reporting port indexes, reference signal port group indexes, or reference signal port group set indexes under different reference signal resources.

Optionally, determining at least one of the first type channel state information set or the second type channel state information set and reporting the at least one of the first type channel state information set or the second type channel state information set to the second communication node further include: determining a port group set, where the port group set includes one or more port groups.

Optionally, the at least one of the first type channel state information set or the second type channel state information set is reported to the second communication node according to at least one of the following rules:

under different port group sets, reporting port indexes or reference signal port group indexes; or under a same port group set, reporting no more than W2 or W2 reference signal port indexes or no more than W3 or W3 reference signal port group indexes;

where W2 and W3 are integers greater than or equal to 1.

Optionally, determining the port group set includes: determining the port group set by a predefined rule or by configuration of the second communication node.

Optionally, the at least one of the first type channel state information set or the second type channel state information set is reported to the second communication node according to at least one of the following rules:

only reporting port indexes or reference signal port group indexes under a same port group set; or precluding reporting port indexes or reference signal port group indexes under different port group sets.

Optionally, the predefined rule includes at least one of: constituting one port group set by every F1 port groups in order according to port group indexes, constituting two port group sets by port groups according to odd port group indexes and even port group indexes, or dividing all port groups into F2 port group sets.

F1 and F2 are integers greater than or equal to 1.

Optionally, the second communication node configures at least one of F1 or F2.

Optionally, the method further includes at least one of: reporting association information between subsets in the first type channel state information set and subsets in the second type channel state information set, reporting layer information associated with the subsets in the first type channel state information set, or reporting layer information associated with the subsets in the second type channel state information set.

Optionally, a bitmap is used for indicating one of: the association information between the subsets in the first type channel state information set and the subsets in the second type channel state information set; the layer information associated with the subsets in the first type channel state information set; or the layer information associated with the subsets in the second type channel state information set.

When a bit position in the bitmap is a first predetermined value, it is indicated that the subsets in the first type channel state information set are associated with the subsets in the second type channel state information set.

Optionally, the method includes one of following indications:

the bitmap is associated with the subsets in the first type channel state information set, if the bit position is the first predetermined value, it indicates that the subsets in the first type channel state information set are associated with the subsets in the second type channel state information set associated with the bit position;

the bitmap is associated with the subsets in the first type channel state information set and associated with the subsets in the second type channel state information set, and bit position information of the bitmap indicates layer information associated with the subsets in the first type channel state information set and layer information associated with the subsets in the second type channel state information set; or the bitmap is associated with the subsets in the second type channel state information set, and if the bit position is a second predetermined value, it indicates that the subsets in the second type channel state information set are associated with the subsets in the first type channel state information set associated with the bit position.

Optionally, the first predetermined value or an upper limit of the first predetermined value is configured by the second communication node.

Optionally, a quantity of bits with specific values in the bitmap associated with each of the subsets in the first type channel state information set is the same; or a quantity of bits with specific values in the bitmap associated with each of the subsets in the second type channel state information set is the same.

Optionally, a selectable quantity of subsets of the first type channel state information determines a quantity of feedback bits of the subsets of the first type channel state information, or a selectable quantity of elements of the first type channel state information determines a quantity of feedback bits of the elements of the first type channel state information.

In a second aspect, the present application provides a channel state information reporting apparatus which is arranged at a first communication node. The apparatus includes a receiving module and a processing module.

The receiving module is configured to receive a reference signal sent by a second communication node.

The processing module is configured to determine, according to a first type reporting configuration signaling associated with the reference signal, at least one of a first type channel state information set or a second type channel state information set, and report the at least one of the first type channel state information set or the second type channel state information set to the second communication node.

The first type channel state information set includes at least one of a reference signal resource index, a reference signal resource set index, a reference signal resource setting index, a reporting configuration index, a reference signal port group index, a reference signal port group set index, a port index, or rank indicator information.

The second type channel state information set includes at least one of precoding matrix indicator information, channel quality indicator information, an amplitude coefficient, a phase coefficient, or a reference signal received power.

In a third aspect, the present application provides a channel state information receiving method applied to a second communication node. The method includes:

sending a reference signal to a first communication node; and receiving at least one of a first type channel state information set or a second type channel state information set which is determined by the first communication node according to a first type reporting configuration signaling associated with the reference signal.

The first type channel state information set includes at least one of a reference signal resource index, a reference signal resource set index, a reference signal resource setting index, a reporting configuration index, a reference signal port group index, a reference signal port group set index, a port index, or rank indicator information.

The second type channel state information set includes at least one of precoding matrix indicator information, channel quality indicator information, an amplitude coefficient, a phase coefficient, or a reference signal received power.

Optionally, the reference signal includes N reference signal resource settings, one of the N reference signal resource setting includes M reference signal resource sets, one of the M reference signal resource sets includes K reference signal resources, and one of the K reference signal resources includes L reference signal ports.

N, M, K and L are integers greater than or equal to 1.

Optionally, the received at least one of the first type channel state information set or the received second type channel state information set includes at least one of the following:
  the first type channel state information set includes I first type state information subsets, one first type state information subset includes at least one of the reference signal resource index, the reference signal resource set index, the reference signal resource setting index, the reporting configuration index, the reference signal port group index, the reference signal port group set index, the port index, or the rank indicator information; or
  the second type channel state information set includes J second type state information subsets, one second type state information subset includes at least one of the precoding matrix indicator information, the channel quality indicator information, the amplitude coefficient, the phase coefficient, or the reference signal received power.

I and J are integers greater than or equal to 1.

Optionally, the first type channel state information set further includes a wideband parameter or a partial-band parameter.

Optionally, the first type channel state information set includes at least one of: reference signal resource set indexes whose quantity is A0, reference signal resource indexes whose quantity is A1, or reference signal port group indexes whose quantity is A2.

A0, A1 and A2 are integers greater than or equal to 0.

Optionally, the first type reporting configuration signaling configures at least one of following parameters: A0, A1, or A2.

Optionally, the first type channel state information set includes at least one of: reference signal resource set indexes whose quantity is at most B0 or reference signal resource set indexes whose quantity is not less than C0, reference signal resource indexes whose quantity is at most B1 or reference signal resource indexes whose quantity is not less than C1, or reference signal port group indexes whose quantity is at most B2 or reference signal port group indexes whose quantity is not less than C2.

B0, C0, B1, C1, B2 and C2 are integers greater than or equal to 0.

Optionally, the first type reporting configuration signaling configures at least one of following parameters: B0, C0, B1, C1, B2 or C2.

Optionally, the first type reporting configuration signaling is configured according to at least one of following rules:
  under different reference signal resource settings, reporting port indexes, reference signal port group indexes, reference signal port group set indexes, reference signal resource indexes, or reference signal resource set indexes under the different reference signal resource settings; or
  under a same reference signal resource setting, reporting no more than U0 or U0 reference signal port indexes, no more than U1 or U1 reference signal port group indexes, no more than U2 or U2 reference signal port group set indexes, no more than U3 or U3 reference signal resource indexes, or no more than U4 or U4 reference signal resource set indexes under the same reference signal resource setting;
  where U0, U1, U2, U3 and U4 are integers greater than or equal to 1.

Optionally, the first type reporting configuration signaling configures at least one of following parameters: U0, U1, U2, U3 or U4.

Optionally, the first type reporting configuration signaling is configured according to at least one of following rules:
  only reporting port indexes, reference signal port group indexes, reference signal port group set indexes, reference signal resource indexes, or reference signal resource set indexes under a same reference signal resource setting; or
  precluding reporting port indexes, reference signal port group indexes, reference signal port group set indexes, reference signal resource indexes, or reference signal resource set indexes under different reference signal resource settings.

Optionally, the first type reporting configuration signaling is configured according to at least one of following rules:
  under different reference signal resource sets, reporting port indexes, reference signal port group indexes, reference signal port group set indexes, or reference signal resource indexes under the different reference signal resource sets; or
  under a same reference signal resource set, reporting no more than V0 or V0 reference signal port indexes, no more than V1 or V1 reference signal port group indexes, no more than V2 or V2 reference signal port group set indexes, or no more than V3 or V3 reference signal resource indexes under the same reference signal resource set;
  where V0, V1, V2 and V3 are integers greater than or equal to 1.

Optionally, the first type reporting configuration signaling configures at least one of following parameters: V0, V1, V2 or V3.

Optionally, the first type reporting configuration signaling is configured according to at least one of following rules:
  only reporting port indexes, reference signal port group indexes, reference signal port group set indexes, or reference signal resource indexes under a same reference signal resource set; or
  precluding reporting port indexes, reference signal port group indexes, reference signal port group set indexes, or reference signal resource indexes under different reference signal resource sets.

Optionally, the first type reporting configuration signaling is configured according to at least one of following rules:
  under different reference signal resources, reporting port indexes, reference signal port group indexes, or reference signal port group set indexes under the different reference signal resources; or
  under a same reference signal resource, reporting no more than W0 or W0 reference signal port indexes, no more than W1 or W1 reference signal port group indexes, or no more than S1 or S1 reference signal port group set indexes under the same reference signal resource;
  where W0, W1 and S1 are integers greater than or equal to 1.

Optionally, the first type reporting configuration signaling configures parameters of at least one of W0, W1 or S1.

Optionally, the first type reporting configuration signaling is configured according to at least one of following rules:
  only reporting port indexes, reference signal port group indexes, or reference signal port group set indexes under a same reference signal resource; or
  precluding reporting port indexes, reference signal port group indexes, or reference signal port group set indexes under different reference signal resources.

Optionally, receiving at least one of the first type channel state information set or the second type channel state information set further includes: determining a port group set, where the port group set includes one or more port groups.

Optionally, the first type reporting configuration signaling is configured according to at least one of following rules:
under different port group sets, reporting port indexes or reference signal port group indexes under different reference signal resource settings; or
under a same port group set, reporting no more than W2 or W2 reference signal port indexes or no more than W3 or W3 reference signal port group indexes under the reference signal resource setting;
where W2 and W3 are integers greater than or equal to 1.

Optionally, the port group set is acquired in at least one of the following manners:
by a predefined rule or by configuration of the second communication node.

Optionally, the first type reporting configuration signaling is configured according to at least one of following rules:
only reporting port indexes or reference signal port group indexes under a same port group set; or
precluding reporting port indexes or reference signal port group indexes under different port group sets.

Optionally, the predefined rule includes at least one of: constituting one port group set by every F1 port groups in order according to port group indexes, constituting two port group sets by port groups according to odd port group indexes and even port group indexes, or dividing all port groups into F2 port group sets.

F1 and F2 are integers greater than or equal to 1.

Optionally, the second communication node configures at least one of F1 or F2.

Optionally, the method further includes one of: receiving association information between subsets in the first type channel state information set and subsets in the second type channel state information set which is reported by the first communication node; receiving layer information associated with the subsets in the first type channel state information set which is reported by the first communication node; or receiving layer information associated with the subsets in the second type channel state information set which is reported by the first communication node.

In a fourth aspect, the present application provides a channel state information receiving apparatus which is arranged at a second communication node. The apparatus includes a sending module and a set module.

The sending module is configured to send a reference signal to a first communication node.

The set module is configured to receive at least one of a first type channel state information set or a second type channel state information set which is determined by the first communication node according to a first type reporting configuration signaling associated with the reference signal.

The first type channel state information set includes at least one of a reference signal resource index, a reference signal resource set index, a reference signal resource setting index, a reporting configuration index, a reference signal port group index, a reference signal port group set index, a port index, or rank indicator information.

The second type channel state information set includes at least one of precoding matrix indicator information, channel quality indicator information, an amplitude coefficient, a phase coefficient, or a reference signal received power.

Compared with the existing art, the present application has beneficial effects described below.

In the solution of the present application, according to restriction on beam transmitting capability of a transmitting end, an effective restriction is achieved, through configuration, for a receiving end to select reference signal feedback, and joint channel state information feedback of the analog domain and the digital domain is achieved under scenarios of multiple TRP stations, multiple base stations (or TRPs) and multiple panels. The information of the multiple base stations (or TRP) and the multiple panels and the beams in the analog domain is fed back through the first type channel state information, and the related information in the digital domain is fed back through the second type channel state information. Two kinds of information are associated through an association relationship and jointly reported, which significantly improves the system performance.

DETAILED DESCRIPTION

Objects, solutions and beneficial effects of the present application will be more apparent from a description of embodiments of the present disclosure in conjunction with the drawings. It is to be noted that if not in collision, the embodiments described herein and the features therein may be combined arbitrarily.

Figure 1:
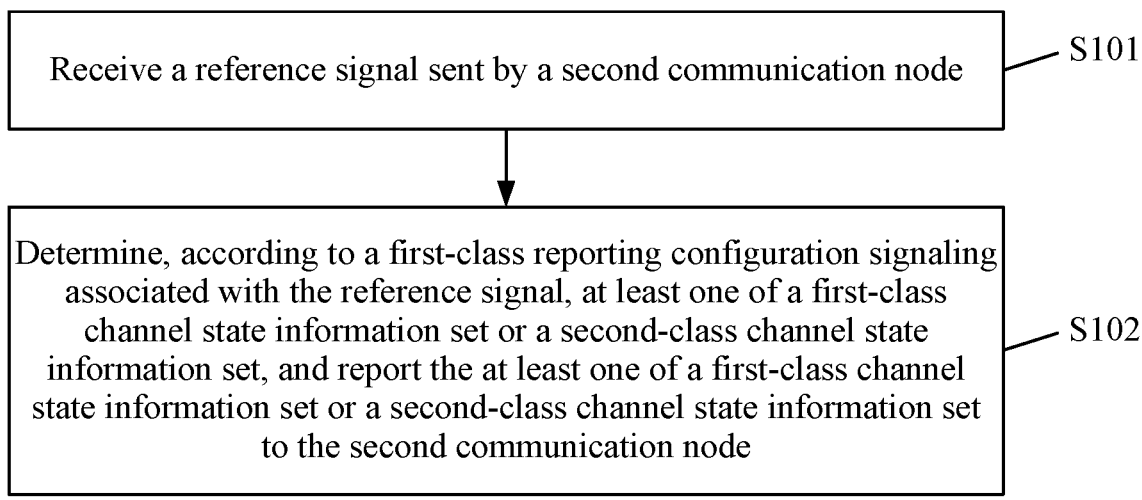
FIG. 1 is a flowchart of a channel state information reporting method according to an embodiment of the present disclosure.

As shown in FIG. 1, an embodiment of the present disclosure provides a channel state information reporting method applied to a user equipment (UE). The method includes steps described below.

In S101, a reference signal sent by a base station is received.

In step S102, channel state information is reported to the base station according to a first type reporting configuration signaling associated with the reference signal, where the reported channel state information needs to satisfy a predetermined restriction or a restriction of the first type reporting configuration signaling.

Further, the base station uses a transmitting beam to bear the reference signal, and the UE receives the reference signal via a receiving beam.

Further, feedback of the channel state information is used for achieving joint determination of selection of a (analog)

transmitting beam (or selection of a pair of the transmitting beam and the receiving beam) and a digital transmit side precoding.

The reference signal includes at least one of the following.
1) Channel state information reference signal (CSI-RS)
2) Channel state information interference measurement signal (CSI-IM)
3) Demodulation reference signal (DMRS)
4) Downlink demodulation reference signal (DL DMRS)
5) Uplink demodulation reference signal (UL DMRS)
6) Channel sounding reference signal (SRS)
7) Phase tracking reference signal (PT-RS)
8) Random access channel signal (RACH)
9) Synchronization signal (SS)
10) Synchronization signal block (SS block)
11) Primary synchronization signal (PSS)
12) Secondary synchronization signal (SSS)

The beam may be a resource (e.g., a transmit side spatial filter, a receive side spatial filter, transmit side precoding, receive side precoding, an antenna port, an antenna weight vector (AWV) and an antenna weight matrix, etc.). A beam index may be replaced with a resource index (e.g., a reference signal resource index) since the beam may be bound, for transmission, to some time-frequency-code resources. The beam may also be a transmission (transmitting/receiving) manner. The transmission manner may include spatial multiplexing, frequency-domain/time-domain diversity or the like.

Furthermore, the base station may perform Quasi co-location configuration for two reference signals and inform the UE. Parameters related to the Quasi co-location at least include: Doppler spread, Doppler shift, delay spread, average delay, average gain and spatial parameters, where the spatial parameters may include spatial receiving parameters, such as angle of arrival, spatial correlation of a received beam, average delay and time-frequency channel response correlation (including phase information).

Figure 2:
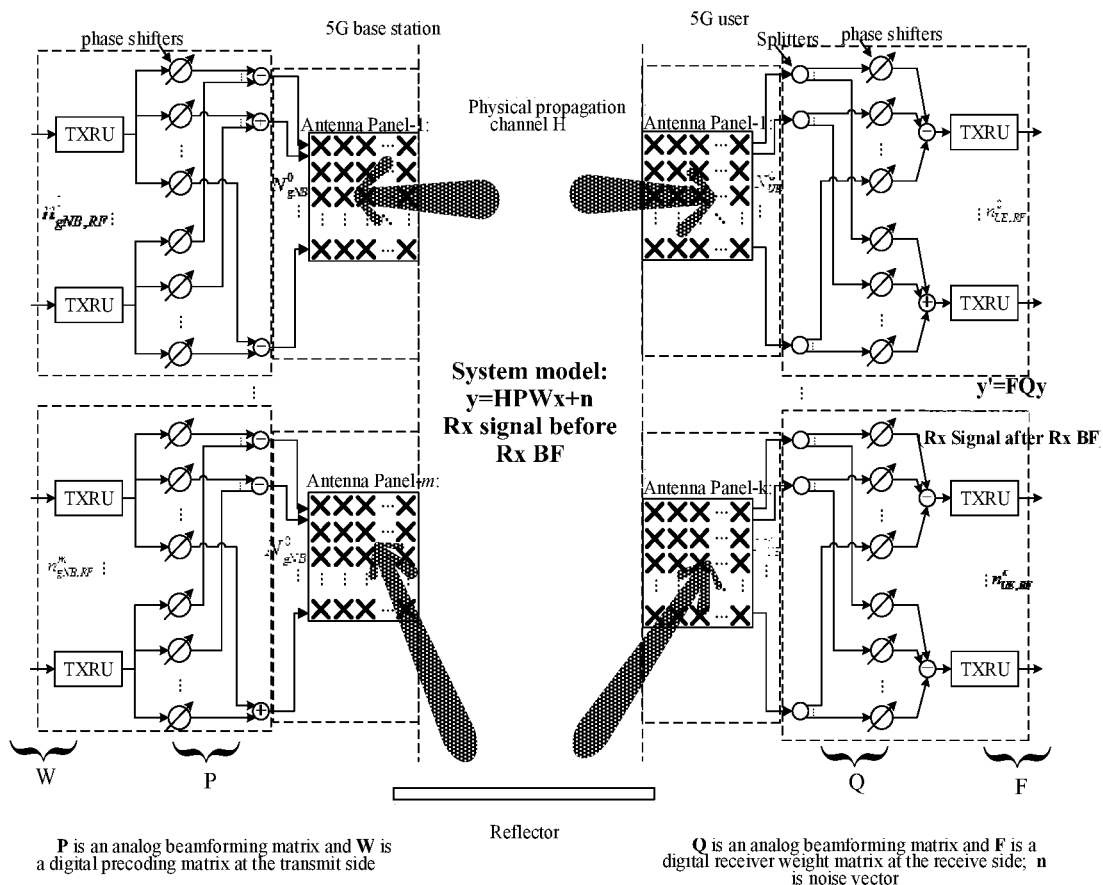
FIG. 2 is a schematic structural diagram of a transceiver for hybrid precoding beamforming according to an embodiment of the present disclosure.

FIG. 2 is a structural diagram of a transceiver orienting to hybrid precoding (hybrid analog and digital beamforming) according to an embodiment of the present disclosure. A transmit side and a receive side are each configured with a multi-antenna array unit (i.e., an antenna panel), and each antenna panel includes multiple transceiving antennas and multiple radio frequency links (i.e., TXRUs). Each radio frequency link is connected to the antenna array unit (a partial connection scenario is not excluded), and each antenna unit and the TXRU have a digital keying phase shifter. A high frequency band system implements beamforming at an analog end by loading different phase shifts on signals of respective antenna units. Specifically, in a hybrid beamforming transceiver, multiple radio frequency signal streams are included. Each signal stream is loaded with an AWV via the digital keying phase shifters and sent from the multi-antenna unit to a high frequency band physical propagation channel. At the receive side, radio frequency signal streams received by the multi-antenna array unit are weighted and combined into a single signal stream, and after radio frequency demodulation is performed at the receive side, a receiver finally obtains multiple received signal streams which are sampled and received by a digital baseband. Therefore, the hybrid precoding (hybrid analog and digital beamforming) transceiver may simultaneously generate radio frequency beams in multiple directions.

At the same time, the transmit side and the receive side may each include multiple panels to better support spatial multiplexing and reduce the complexity of hardware implementation. Therefore, under each panel, the number of effective beams is asymmetric to the number of maximum transmitted beams that can be supported actually, i.e., the number of beams that can be transmitted at each moment, i.e., the number of TXRUs, is much less than the number of optional beams.

From the point of view of the base station, the antenna array unit can generate Nmax beams, but at one moment, only N beams can be generated; for example, the antenna array unit can generate 16 beams, but only one beam can be transmitted at one moment. Transmitting beams are not limited among different panels, so that kN beams can be generated at the same time, where k denotes the number of panels located at the base station. From the point of view of interaction between the base station and the UE, feedback of the channel state information needs to repeatedly consider whether currently transmitted reference signals can be sent at the same time. For example, if the UE feeds back combined PMI/CQI information under two transmitting beams but the two transmitting beams cannot be transmitted together (e.g., from the same antenna panel), then such feedback of channel state information is meaningless.

Figure 3:
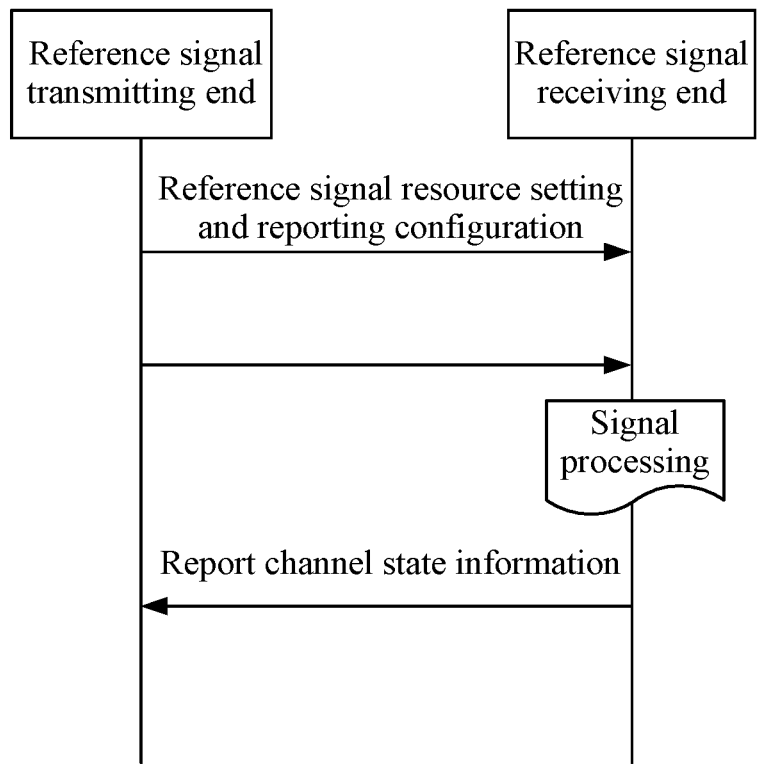
FIG. 3 is a schematic diagram of transmitting a reference signal and feeding back channel state information according to an embodiment of the present disclosure.

FIG. 3 is a schematic diagram of transmitting a reference signal and feeding back channel related information according to an embodiment of the present disclosure. A reference signal transmitting end transmits a reference signal resource setting and a first type reporting configuration signaling to a reference signal receiving end, and transmits the reference signal to the reference signal receiving end. The reference signal resource setting and the reporting configuration signaling are jointly used for restricting the report of the channel state information.

Figure 4:
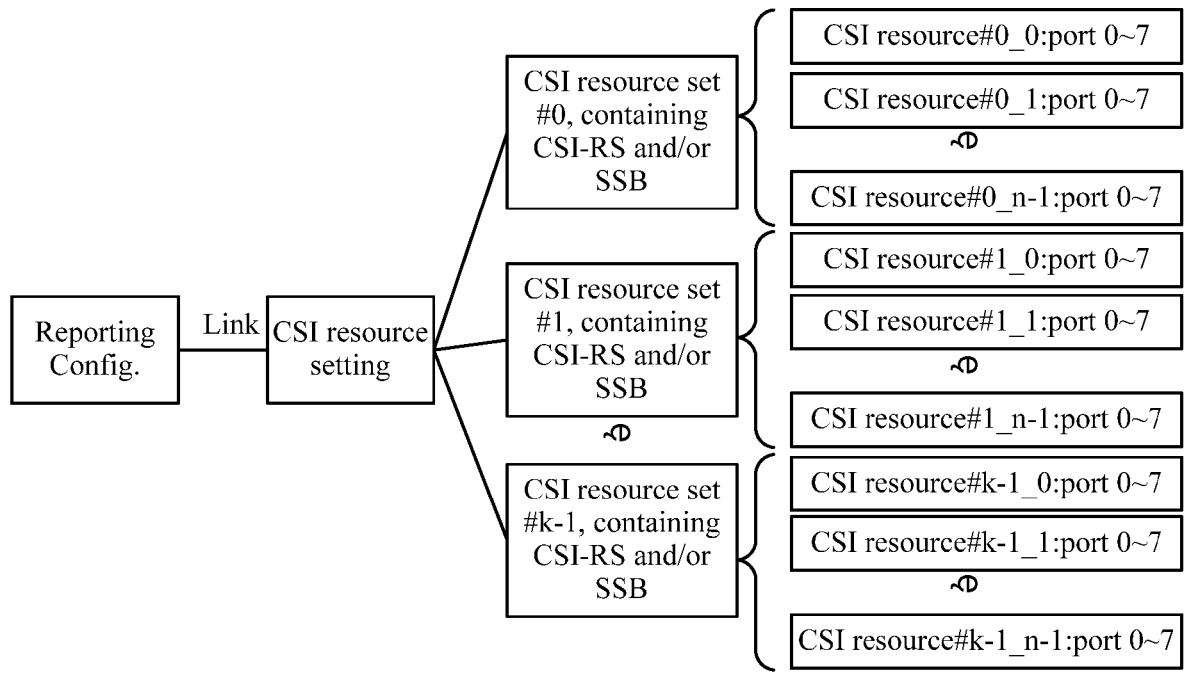
FIG. 4 is a schematic diagram of a reference signal setting according to an embodiment of the present disclosure.

As shown in FIG. 4, for the reference signal, a setting framework adopts a multi-layer structure. A reporting setting (also called as reporting configuration) is associated with one or more reference signal resource settings (that is, CSI resource setting, or multiple reference signal resource settings). Each reference signal resource setting (CSI resource setting) includes k reference signal resource sets (CSI resource sets). Each reference signal resource set (CSI resource set) includes multiple CSI-RS resources or multiple SS blocks, where each reference signal resource includes one or more ports or one or more port groups. Through such multi-layer structure, the base station may effectively restrict setting restrictions on different layers. In the embodiment of the present disclosure, the reference signal includes N reference signal resource settings, one reference signal resource setting includes M reference signal resource sets, one reference signal resource set includes K reference signal resources, and one reference signal resource includes L reference signal ports, where N, M, K and L are integers greater than or equal to 1.

Further, the channel state information includes a first type channel state information set and a second type channel state information set. The first type channel state information set includes at least one of an RS resource index, an RS resource set index, an RS resource setting index, a reporting configuration index, an RS port group index, an RS port group set index, a port index or a rank indicator (RI). Elements in the first type channel state information set are wideband parameters or partial-band parameters (the wideband parameters refer to the fact that all related bandwidths can be covered in the whole feedback event, and the partial-band parameters refer to the fact that partial bandwidths can be acted on in the whole feedback event). The second type channel state information set includes at least one of an RS resource index, an RS port group set index, an RS port group index, a rank indicator (RI), a precoding matrix indicator (PMI), a channel quality indicator (CQI), a layer indicator (LI), a port index, an amplitude coefficient, a phase coefficient or a reference signal received power.

In the embodiment of the present disclosure, the first type channel state information set includes I first type state information subsets, where one first type state information subset includes at least one of the RS resource index, the RS resource set index, the RS resource setting index, the reporting configuration index, the RS port group index, the RS port group set index, the port index, or the RI.

The second type channel state information set includes J second type state information subsets, where one second type state information subset includes at least one of the RS resource index, the RS port group set index, the RS port group index, the RI, the PMI, the CQI, the port index, the amplitude coefficient, the phase coefficient, or the reference signal received power.

I and J are integers greater than or equal to 1.

Further, in the first type channel state information set, at least one of following information is restricted: RS resource set indexes whose quantity is A0, RS resource indexes whose quantity is A1, or RS port group indexes whose quantity is A2; that is, the report needs to satisfy the following condition: for example, the base station requires a user end to report two RS resource sets (corresponding to two different panels) and a quantity of the RS resource index under each RS resource set (e.g., one RS resource index is reported under each RS resource set).

A0, A1 and A2 are integers greater than or equal to 0.

Further, the first type reporting configuration signaling configures at least one of following parameters: A0, A1, or A2.

In other aspect, the base station may not be able to accurately determine that the UE will select beams from which panel or proportions of selected beams from multiple panels. In this case, the base station may restrict by restricting an upper limit of a reported quantity of the RS resource index under one RS resource set or a lower limit of the reported quantity of the RS resource index under one RS resource set. Further, in this case, the base station needs to specify a reported total quantity of RS indexes, and this quantity may also be reflected by the above described A0/A1/A2, i.e., a global quantity.

Specifically, the first type channel state information set includes at least one of: RS resource set indexes whose quantity is at most B0 or RS resource set indexes whose quantity is not less than C0, RS resource indexes whose quantity is at most B1 or RS resource indexes whose quantity is not less than C1, or RS port group indexes whose quantity is at most B2 or RS port group indexes whose quantity is not less than C2.

B0, C0, B1, C1, B2 and C2 are integers greater than or equal to 0.

Further, the first type reporting configuration signaling configures at least one of following parameters: B0, C0, B1, C1, B2 or C2.

Embodiment One

An embodiment describes a process of distinguishing different panels/TRPs based on reference signal settings.

When configuring multiple reference signal settings, different reference signal settings may correspond to different panels/TRPs. In this case, different panels/TRPs may be distinguished by the following grouping criteria.

Under different reference signal resource settings, port indexes, RS port group indexes, RS resource indexes, or RS resource set indexes under the different reference signal resource settings can be reported.

Under a same reference signal resource setting, i.e., under one reference signal resource setting, no more than U0 or U0 RS port indexes, or no more than U1 or U1 RS port group indexes, or no more than U2 or U2 RS port group set indexes, or no more than U3 or U3 RS resource indexes, or no more than U4 or U4 RS resource set indexes can be reported.

U0, U1, U2, U3 and U4 are integers greater than or equal to 1, for example, U0=1 or U1=1 or U2=1 or U3=1 or U4=1.

Further, in the case of 3 panels, the base station may set three RS resource settings, then each RS resource setting includes one RS resource set used for periodic channel measurement, and one RS set includes R RS resources (where each RS resource corresponds to one transmitting beam and includes multiple RS antenna ports). Therefore, considering that only one reference signal in one panel can be sent at one moment and different reference signals cannot be sent at the same time, a user end UE reporting criteria is as follows:

under a same RS resource setting, only one RS resource can be reported, i.e., U2=1, that is, index information of the RS resource;

under different RS resource settings, i.e., when different RS resource setting are selected, different RS resources can be reported.

Further, a first type reporting configuration signaling configures at least one of following parameters: U0, U1, U2, U3 or U4.

Alternatively, the panel or TRP at the base station end is selected, i.e., only the port index, the RS port group index, the RS resource index, or the RS resource set index under the same RS resource setting can be reported; and the port indexes, the RS port group indexes, the RS resource indexes or the RS resource set indexes under different reference signal resource settings cannot be reported.

Embodiment Two

An embodiment describes a process of distinguishing different panels/TRPs based on reference signal resource sets.

When configuring multiple reference signal resource sets, different reference signal sets may correspond to different panels/TRPs. In this case, different panels/TRPs may be distinguished by the following grouping criteria.

Under different reference signal resource sets, port indexes, RS port group indexes, or RS resource indexes can be reported.

Under a same reference signal resource set, no more than V0 or V0 RS port indexes, or no more than V1 or V1 RS port group indexes, or no more than V2 or V2 RS port group set indexes, or no more than V3 or V3 RS resource indexes can be reported.

V0, V1, V2 and V3 are integers greater than or equal to 1, such as V0=1 or V1=1 or V2=1 or V3=1.

Further, in the case of 3 TRPs, the base station may set three RS resource sets, and then each RS resource set includes R RS resources (where each RS resource corresponds to one transmitting beam and includes multiple RS antenna ports). Therefore, considering that only one reference signal in one TRP can be sent at one moment and different reference signals cannot be sent at the same time, a user end UE reporting criteria are as follows:

under a same RS resource set, only one RS resource can be reported, i.e., V2=1, that is, index information of the RS resource.

under different RS resource sets, that is, when different RS resource sets are selected, different RS resources can be reported.

Further, the first type reporting configuration signaling configures at least one of following parameters: V0, V1, V2 or V3.

Alternatively, the panel or TRP at the base station end is selected, and the grouping criteria include at least one of: only reporting the port indexes, the RS port group indexes, or the RS resource indexes under the same RS resource set; or precluding reporting the port indexes, the RS port group indexes, or the RS resource indexes under the different reference signal resource sets.

Embodiment Three

An embodiment describes processes of distinguishing TRPs based on reference signal settings and distinguishing different panels based on reference signal resource sets.

Further, the above grouping criteria based on the reference signal settings and the above grouping criteria based on the reference signal resource sets may be combined.

For example, if a TRP is selected and a panel under one TRP may select multiple beams, a criteria is as follows:

only a port index, an RS port group index, an RS resource index, or an RS resource set index under a same reference signal resource setting can be reported;

under different reference signal resource sets, port indexes, RS port group indexes, or RS resource indexes can be reported;

under a same RS resource set, one RS resource index can be reported;

and port indexes, RS port group indexes, RS resource indexes, or RS resource set indexes under different reference signal resource settings cannot be reported.

Embodiment Four

An embodiment may reflect characteristics of different TRPs and different panels in a manner of reference signal resources, which is specifically described as follows.

Under different reference signal resources, port indexes or RS port group indexes can be reported.

Under a same reference signal resource set, no more than W0 or W0 RS port indexes, or no more than W1 or W1 RS port group indexes, or no more than S1 or S1 RS port group set indexes can be reported.

W0, W1 and S1 are integers greater than or equal to 1, and the first type reporting configuration signaling configures the parameters W0, W1 and S1.

Alternatively, a second grouping manner may be used and is described as follows:

only a port index or an RS port group index under the same RS resource set can be reported;

port indexes or RS port group indexes under different RS resource sets cannot be reported.

Embodiment Five

An embodiment may reflect characteristics of different TRPs and different panels by constituting a reference signal port group set.

Firstly, a UE end determines a port group set, where the port group set is composed of one or more port groups.

Further, the port group set includes one of the following characteristics:

under different port group sets, port indexes or RS port group indexes under the different reference signal resource settings can be reported;

under a same port group set, no more than W2 or W2 RS port indexes or no more than W3 or W3 RS port group indexes under the reference signal resource setting can be reported.

W2 and W3 are integers greater than or equal to 1.

The port group set is determined by a predefined rule or configured by a second communication node.

Alternatively, the port group set has following characteristics, and the UE needs to satisfy the characteristics for reporting channel state information:

only a port index or an RS port group index under a same port group set can be reported;

port indexes or RS port group indexes under different port group sets cannot be reported.

Further, the predefined rule includes at least one of the following:

one port group set is constituted by every F1 port groups in order according to port group indexes;

two port group sets are constituted by port groups according to odd port group indexes and even port group indexes; or all port groups are divided into F2 port group sets according to the port group indexes.

F1 or F2 is configured by the second communication node, i.e., the base station end.

Embodiment Six

First type channel state information feeds back corresponding information about TRP, panel and beam, while the feedback for a digital precoding needs to be fed back through second type channel state information. Therefore, it is necessary to specify association information between subsets in a first type channel state information set and subsets in a second type channel state information set.

For example, the first type channel state information includes two subsets, where each subset includes one CRI and one resource set index. Subsets of the second type channel state information, such as two PMIs, need to correspond to the two subsets of the first type channel state information, respectively. The PMI includes precoding information of each layer, however, the CRI needs to be mapped to all precoding. Further, the feedback determination of the CRI is based on the fed-back resource set index, and the feedback of the resource set index is based on the fed-back RS setting index.

Further, a bitmap field (or called as a bitmap or a bit string) may be used to indicate the association information between the subsets in the first type channel state information set and the subsets in the second type channel state information set; or to report layer information associated with the subsets in the first type channel state information set; or to report layer information associated with the subsets in the second type channel state information set.

Further, the bitmap is associated with the subsets in the first type channel state information set, and if a bit position is a first predetermined value, it is indicated that the subsets in the first type channel state information set are associated with the subsets in the second type channel state information set associated with the bit position; or the bitmap is associated with the subsets in the first type channel state information set and is associated with the subsets in the second type channel state information set, and bit position information of the bitmap indicates layer information associated with the subsets in the first type channel state information set and layer information associated with the subsets in the second type channel state information set; or further, the bitmap is associated with the subsets in the second type channel state information set, and if a bit position is a second predetermined value, it is indicated that the subsets in the second type channel state information set are associated with the subsets in the first type channel state information set associated with the bit position.

A quantity of predetermined value or an upper limit of the quantity of the predetermined value in the bitmap is configured by the second communication node.

Further, the quantity of specific value in the bitmap associated with each subset of the first type channel state information set is the same; or the quantity of specific value in the bitmap associated with each subset of the second type channel state information set is the same. Further, an association relationship exists between internal elements of the subsets in the second type channel state information set and the internal elements are mapped to elements of specific values in the bitmap in order.

The selectable quantity of subsets of the first type channel state information determines the quantity of feedback bits of the subsets of the first type channel state information, or the selectable quantity of elements of the first type channel state information determines the quantity of feedback bits of the elements of the first type channel state information.

Furthermore, the first type channel state information further includes at least one of: the association information, which is layer indicator information.

For example, considering the restriction on a transmitting beam, Nsimu_max CRI(s) may be selected and may be applied to partial layers. Therefore, Nsimu_max+1 pieces of information may be selected on one layer, and for the first piece of information, no CRI in the table may be used on the one layer.

Alternatively, for example, association of the CRI with the PMI, amplitude information and a phase coefficient is performed in a manner of performing layer indicating by the bitmap, as shown in the following table. It is to be noted that if layer indicator information, which is also called as the associated layer information, is indicated as 1, it is indicated that the layer indicator information is associated with the corresponding layer, then the corresponding amplitude indicator information, phase indicator information and port indicator information are selected to read precoding feedback of the port, the corresponding amplitude and phase under the CRI.

Further, in the case of beam (L1-RSRP) report, RSRP is the second type channel state information, and the reference signal resource set index and the reference signal resource index are the first type channel state information, as shown in the following table.

| First type channel state information | | Second type channel state information |
|---|---|---|
| Resource set ID-1 (wide-band) | CRI-1 (wide-band) | RSRP-1 |
| | CRI-2 (wide-band) | RSRP-2 |
| Resource set ID-2 (wide-band) | CRI-2 (wide-band) | RSRP-2 |

Therefore, in the present application, issues about multiple base stations (or multiple TRPs) and multiple panels and joint reporting of analog domain beams and digital domain beams are achieved through feedback of the first type channel state information, feedback of the second type channel state information, and the association information between the first type channel state information and the second type channel state information, such as the bitmap. Further, information about the multiple base stations (or TRPs) and the multiple panels and the analog domain beams is fed back through the first type channel state information, and the digital domain related information is fed back through the second type channel state information. Finally, two kinds of information are associated through the association relationship and jointly reported, such as the layer indicator information in above table.

Embodiment Seven

Figure 5:
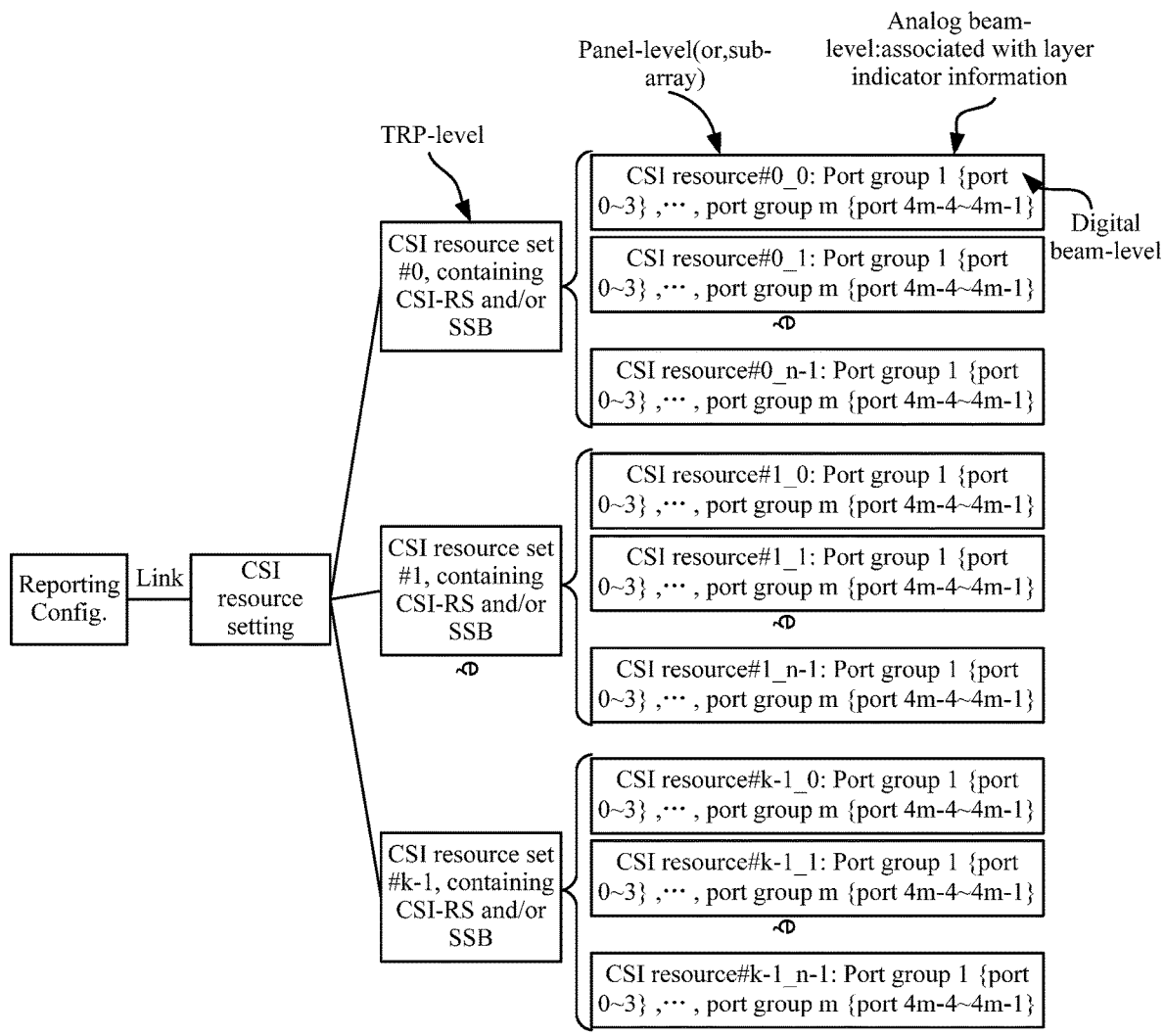
FIG. 5 is another schematic diagram of a reference signal setting according to an embodiment of the present disclosure.

As shown in FIG. 5, an embodiment of the present disclosure further provides another schematic diagram of another reference signal setting. A reporting configuration is associated with a CSI resource setting, where the CSI resource setting total includes k CSI resource sets, each CSI resource set includes n CSI resources, each CSI resource includes m port groups, and each port group includes 4 ports. From the point of view of a base station, different ports correspond to different digital beams, different port groups correspond to different analog beams, and different CSI resources correspond to different panels or subarrays. In addition, different TRP-levels are distinguished by different CSI resource sets.

From the point of view of channel state information reporting, a first type channel state information set is composed of "a reference signal resource index, a reference signal resource set index, a reference signal port group index and rank indicator", and a second type channel state infor-

| | | Layer indicator information | Amplitude indicator information | Phase indicator information | Port indicator information |
|---|---|---|---|---|---|
| Resource set ID-1 (wide-band) | CRI-1 (wide-band) | 0111_1010 | A1 A2 A3 A4 A5 | P1 P2 P3 P4 P5 | X1, X2, X3, X4, X5, |
| | CRI-2 (wide-band) | 1001_1011 | A1 A2 A3 A4 A5 | P1 P2 P3 P4 P5 | X1, X2, X3, X4, X5, |
| | | . . . | | | |
| Resource set ID-2 (wide-band) | CRI-2 (wide-band) | 0101_1010 | A1 A2 A3 A4 | P1 P2 P3 P4 | X1, X2, X3, X4 | mation is composed of "channel quality indicator, an amplitude coefficient and a phase coefficient".

Further, in light of a criteria for reporting, it is intended to select one of the TRPs, and for multiple panels under the TRP, at most one port combination is selected under each panel. Further, there are the following report restrictions:

from the point of view of a reference signal resource set, only a reference signal resource index under a same reference signal resource set is reported; and reference signal resource indexes under different reference signal resource sets are not reported;

from the point of view of a reference signal resource, under different reference signal resources, reference signal port group indexes under the different reference signal resources are reported; and under a same reference signal resource, W1 reference signal port group index under the reference signal resource is reported, where W1=1;

layer indicator information is associated with a reported port group, and is associated with second type channel state information.

Further, channel state information reporting is as shown in the following table. The layer indicator information and first type channel state information are wideband information, and the second type channel state information is sub-band information. In a case of RI=4, one reference signal resource set is selected, and under the one reference signal resource set, one reference signal port group is selected under each of two different resources. Further, the layer indicator information (bitmap) is used to indicate an association between a first type channel state information subset-1, i.e., {CRI-1, Port group-3} and the second type channel state information and an association between a first type channel state information subset-2, i.e., {CRI-2, Port group-1} and the second type channel state information.

ence signal port group. Each CSI resource set includes n CSI resources, each CSI resource includes x port group sets, each port group set includes 2 port groups, and each port group includes 4 ports. From the point of view of a base station, different ports correspond to different digital beams, different port groups correspond to different analog beams, different port group sets correspond to analog beam refinement, and different CSI resources correspond to different panels or subarrays. In addition, different TRP levels are distinguished by different CSI resource sets.

From the point of view of a channel state information reporting, a first type channel state information set is composed of "a reference signal resource index, a reference signal resource set index, a reference signal port group set index, a reference signal port group index and rank indicator information", and a second type channel state information is composed of "channel quality indicator information, an amplitude coefficient and a phase coefficient".

Further, in light of a criteria for reporting, it is intended to select one of the TRPs, and then for multiple panels under the TRP, a beam refinement group under each panel may only select one port combination, however, different beam refinement groups may select different port combinations. Further, there are the following report restrictions:

from the point of view of a reference signal resource set, only a reference signal resource index under a same reference signal resource set is reported; and reference signal resource indexes under different reference signal resource sets are not reported;

from the point of view of a reference signal resource, under different reference signal resources, different reference signal port group set indexes are reported; and under a same reference signal resource, S1 reference signal port group set indexes under the reference signal resource are reported, where S1=2;

| | First type channel state information | | | | Second type channel state information | | |
|---|---|---|---|---|---|---|---|
| Rank indicator information (wide-band) | Reference signal resource set index (wide-band) | Reference signal resource index (wide-band) | Port group index (wide-band) | Layer indicator information (wide-band) | Amplitude coefficient (sub-band) | Phase coefficient (sub-band) | Channel state information (sub-band) |
| RI = 4 | Resource set ID-1 | CRI-1 | Port group-3 | 1100 (wide-band) | $\{P_{0,0}, P_{0,1}, P_{0,2}, P_{0,3}\}$ $\{P_{1,0}, P_{1,1}, P_{1,2}, P_{1,3}\}$ | $\{A_{0,0}, A_{0,1}, A_{0,2}, A_{0,3}\}$ $\{A_{1,0}, A_{1,1}, A_{1,2}, A_{1,3}\}$ | CQI-1, CQI-2 |
| | | CRI-2 | Port group-1 | 0011 (wide-band) | $\{P_{0,0}, P_{0,1}, P_{0,2}, P_{0,3}\}$ $\{P_{1,0}, P_{1,1}, P_{1,2}, P_{1,3}\}$ | $\{A_{0,0}, A_{0,1}, A_{0,2}, A_{0,3}\}$ $\{A_{1,0}, A_{1,1}, A_{1,2}, A_{1,3}\}$ | CQI-3, CQI-4 |

It is to be noted that for the amplitude coefficient and the phase coefficient, related information needs to be provided for each port under the corresponding reference signal port group and the corresponding layer. For example, when the selected reference signal port group includes 4 ports and associated layers are 2 layers (determined by a quantity of a non-zero element in the layer indicator information), {P0,0, P0,1, P0,2, P0,3}-Layer 0, {P1,0, P1,1, P1,2, P1,3}-Layer 1, {A0,0, A0,1, A0,2, A0,3}-Layer 0, {A1,0, A1,1, A1,2, A1,3}-Layer 1 are provided.

Embodiment Eight

Figure 6:
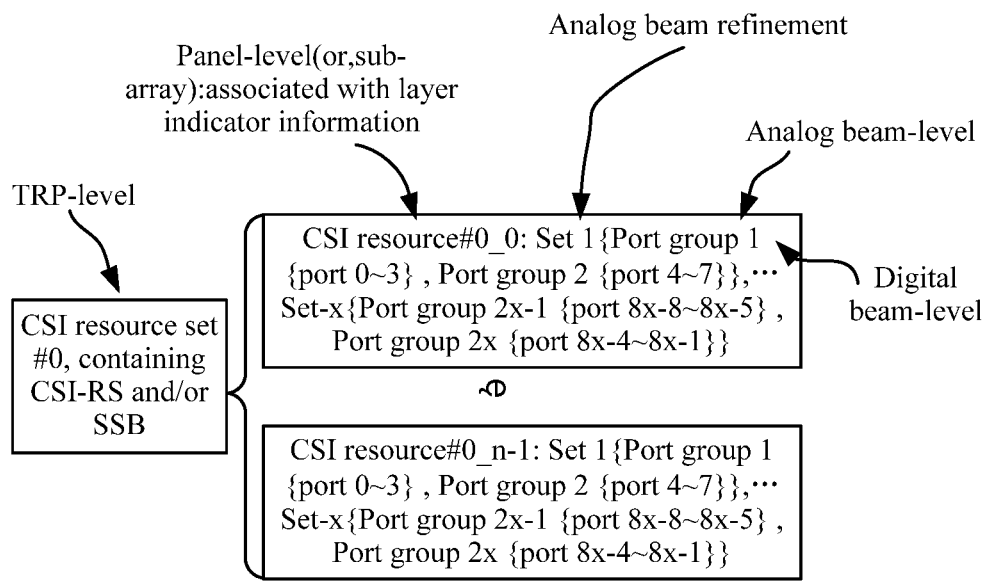
FIG. 6 is a schematic diagram of a reference signal port group set according to an embodiment of the present disclosure.

As shown in FIG. 6, an embodiment of the present disclosure further provides a schematic diagram of a refer-from the point of view of a reference signal port group set, under different port group sets, port indexes or reference signal port group indexes under different reference signal resource settings are reported; and under a same reference signal port group set, W3 reference signal port group index under the reference signal resource setting is reported, where W3=1;

layer indicator information is associated with a reported reference signal resource index, and index information of the layer indicator information and the layer indicator information are both associated with second type channel state information.

Further, the channel state information reporting is as shown in the following table. The layer indicator information and first type channel state information are wideband information, and the second type channel state information is sub-band information. In the case of RI=4, one reference signal resource set is selected, and under the one reference signal resource set, one reference signal port group set is selected under each of two different resources. Further, one reference signal port group is selected in each reference signal port group set. Further, the layer indicator information (bitmap) is used to indicate an association between a first type channel state information subset-1, i.e., {CRI-1} and the second type channel state information and an association between a first type channel state information subset-2, i.e., {CRI-2} and the second type channel state information.

receiving method applied to a second communication node (a base station end), and the method includes steps described below.

In step S201, a reference signal is sent to a first communication node (a UE end).

In step S202, at least one of a first type channel state information set or a second type channel state information set, which is determined by the UE end according to a first type reporting configuration signaling associated with the reference signal, is received.

The first type channel state information set includes at least one of a reference signal resource index, a reference signal resource set index, a reference signal resource setting

| | First type channel state information | | | | | Second type channel state information | | |
|---|---|---|---|---|---|---|---|---|
| Rank indicator information (wide-band) | Reference signal resource set index (wide-band) | Reference signal resource index (wide-band) | Port group set index (wide-band) | Port group index (wide-band) | Layer indicator information (wide-band) | Amplitude coefficient (sub-band) | Phase coefficient (sub-band) | Channel state information (sub-band) |
| RI = 4 | Resource set ID-1 | CRI-1 | Set-1 | Port group-2 | 1100 (wide-band) | $\{P_{0,0}, P_{0,1},$ $P_{0,2}, P_{0,3}\}$ $\{P_{1,0}, P_{1,1},$ $P_{1,2}, P_{1,3}\}$ | $\{A_{0,0}, A_{0,1},$ $A_{0,2}, A_{0,3}\}$ $\{A_{1,0}, A_{1,1},$ $A_{1,2}, A_{1,3}\}$ | CQI-1, CQI-2 |
| | | CRI-2 | Set-1 | Port group-1 | 0011 (wide-band) | $\{P_{0,0}, P_{0,1},$ $P_{0,2}, P_{0,3}\}$ $\{P_{1,0}, P_{1,1},$ $P_{1,2}, P_{1,3}\}$ | $\{A_{0,0}, A_{0,1},$ $A_{0,2}, A_{0,3}\}$ $\{A_{1,0}, A_{1,1},$ $A_{1,2}, A_{1,3}\}$ | CQI-3, CQI-4 |

Embodiment Nine

Figure 7:
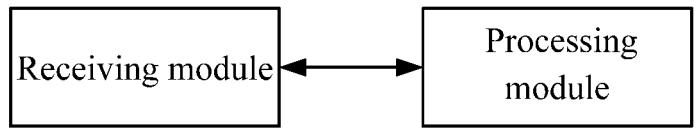
FIG. 7 is a schematic structural diagram of a channel state information reporting apparatus according to an embodiment of the present disclosure.

As shown in FIG. 7, an embodiment of the present disclosure provides a channel state information reporting apparatus which is arranged at a first communication node. The apparatus includes a receiving module and a processing module.

The receiving module is configured to receive a reference signal sent by a second communication node.

The processing module is configured to determine, according to a first type reporting configuration signaling associated with the reference signal, at least one of a first type channel state information set or a second type channel state information set, and report the at least one of the first type channel state information set or the second type channel state information set to the second communication node.

The first type channel state information set includes at least one of a reference signal resource index, a reference signal resource set index, a reference signal resource setting index, a reporting configuration index, a reference signal port group index, a reference signal port group set index, a port index, or rank indicator information.

The second type channel state information set includes at least one of precoding matrix indicator information, channel quality indicator information, an amplitude coefficient, a phase coefficient, or a reference signal received power.

The reference signal includes N reference signal resource settings, one reference signal resource setting includes M reference signal resource sets, one reference signal resource set includes K reference signal resources, and one reference signal resource includes L reference signal ports.

N, M, K and L are integers greater than or equal to 1.

Embodiment Ten

Figure 8:
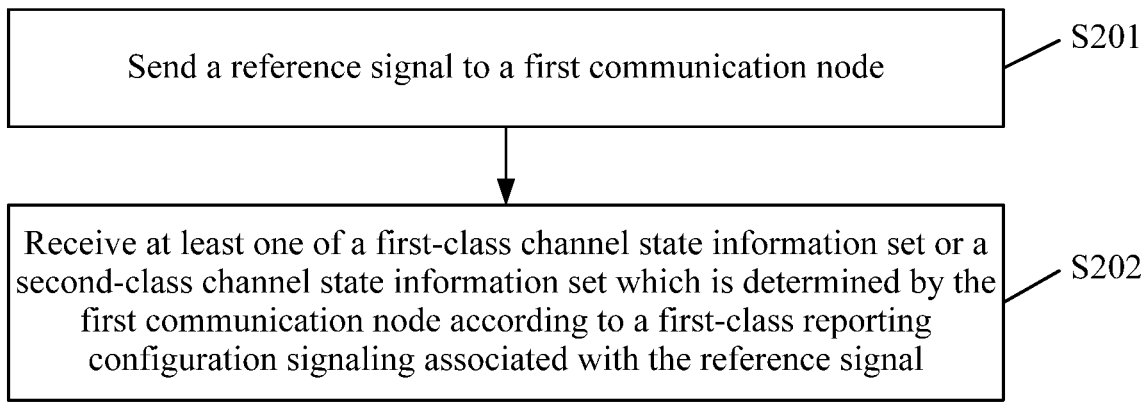
FIG. 8 is a flowchart of a channel state information receiving method according to an embodiment of the present disclosure.

As shown in FIG. 8, an embodiment of the present disclosure further provides a channel state information index, a reporting configuration index, a reference signal port group index, a reference signal port group set index, a port index, or rank indicator information.

The second type channel state information set includes at least one of precoding matrix indicator information, channel quality indicator information, an amplitude coefficient, a phase coefficient, or a reference signal received power.

In an embodiment, the reference signal includes N reference signal resource settings, one reference signal resource setting includes M reference signal resource sets, one reference signal resource set includes K reference signal resources, and one reference signal resource includes L reference signal ports.

N, M, K and L are integers greater than or equal to 1.

In an embodiment, the received at least one of the first type channel state information set or the received second type channel state information set includes at least one of the following:

the first type channel state information set includes I first type state information subsets, one first type state information subset includes at least one of: the reference signal resource index, the reference signal resource set index, the reference signal resource setting index, the reporting configuration index, the reference signal port group index, the reference signal port group set index, the port index, or the rank indicator information; or the second type channel state information set includes J second type state information subsets, one second type state information subset includes at least one of the precoding matrix indicator information, the channel quality indicator information, the amplitude coefficient, the phase coefficient, or the reference signal received power.

I and J are integers greater than or equal to 1.

In an embodiment, the first type channel state information set further includes a wideband parameter or a partial-band parameter.

In an embodiment, the first type channel state information set includes at least one of: reference signal resource set indexes whose quantity is A0, reference signal resource indexes whose quantity is A1 or reference signal port group indexes whose quantity is A2.

A0, A1 and A2 are integers greater than or equal to 0.

Optionally, the first type reporting configuration signaling configures at least one of following parameters: A0, A1 or A2.

In an embodiment, the first type channel state information set includes at least one of: reference signal resource set indexes whose quantity is at most B0 or reference signal resource set indexes whose quantity is not less than C0, reference signal resource indexes whose quantity is at most B1 or reference signal resource indexes whose quantity is not less than C1, or reference signal port group indexes whose quantity is at most B2 or reference signal port group indexes whose quantity is not less than C2.

B0, C0, B1, C1, B2 and C2 are integers greater than or equal to 0.

Optionally, the first type reporting configuration signaling configures at least one of following parameters: B0, C0, B1, C1, B2 or C2.

In an embodiment, the first type reporting configuration signaling is configured according to at least one of following rules:
  under different reference signal resource settings, reporting port indexes, reference signal port group indexes, reference signal port group set indexes, reference signal resource indexes, or reference signal resource set indexes under the different reference signal resource settings; or
  under a same reference signal resource setting, reporting no more than U0 or U0 reference signal port indexes, no more than U1 or U1 reference signal port group indexes, no more than U2 or U2 reference signal port group set indexes, no more than U3 or U3 reference signal resource indexes, or no more than U4 or U4 reference signal resource set indexes under the same reference signal resource setting;
  where U0, U1, U2, U3 and U4 are integers greater than or equal to 1.

Optionally, the first type reporting configuration signaling configures at least one of following parameters: U0, U1, U2, U3 or U4.

In an embodiment, the first type reporting configuration signaling is configured according to at least one of following rules:
  only reporting port indexes, reference signal port group indexes, reference signal port group set indexes, reference signal resource indexes, or reference signal resource set indexes under a same reference signal resource setting; or
  precluding reporting port indexes, reference signal port group indexes, reference signal port group set indexes, reference signal resource indexes, or reference signal resource set indexes under different reference signal resource settings.

In an embodiment, the first type reporting configuration signaling is configured according to at least one of following rules:
  under different reference signal resource sets, reporting port indexes, reference signal port group indexes, reference signal port group set indexes, or reference signal resource indexes under the different reference signal resource sets; or
  under a same reference signal resource set, reporting no more than V0 or V0 reference signal port indexes, no more than V1 or V1 reference signal port group indexes, no more than V2 or V2 reference signal port group set indexes, or no more than V3 or V3 reference signal resource indexes under the same reference signal resource set;
  where V0, V1, V2 and V3 are integers greater than or equal to 1.

Optionally, the first type reporting configuration signaling configures at least one of following parameters: V0, V1, V2 or V3.

In an embodiment, the first type reporting configuration signaling is configured according to at least one of following rules:
  only reporting port indexes, reference signal port group indexes, reference signal port group set indexes, or reference signal resource indexes under a same reference signal resource set; or
  precluding reporting port indexes, reference signal port group indexes, reference signal port group set indexes, or reference signal resource indexes under different reference signal resource sets.

In an embodiment, the first type reporting configuration signaling is configured according to at least one of following rules:
  under different reference signal resources, reporting port indexes, reference signal port group indexes, or reference signal port group set indexes under the different reference signal resources; or
  under a same reference signal resource, reporting no more than W0 or W0 reference signal port indexes, no more than W1 or W1 reference signal port group indexes, or no more than S1 or S1 reference signal port group set indexes under the same reference signal resource;
  where W0, W1 and S1 are integers greater than or equal to 1.

Optionally, the first type reporting configuration signaling configures at least one of following parameters: W0, W1 or S1.

In an embodiment, the first type reporting configuration signaling is configured according to at least one of following rules:
  only reporting port indexes, reference signal port group indexes, or reference signal port group set indexes under a same reference signal resource; or
  precluding reporting port indexes, reference signal port group indexes, or reference signal port group set indexes under different reference signal resources.

In an embodiment, receiving the at least one of the first type channel state information set or the received second type channel state information set further includes: determining a port group set, where the port group set includes one or more port groups.

In an embodiment, the first type reporting configuration signaling is configured according to at least one of following rules:
  under different port group sets, reporting port indexes or reference signal port group indexes; or
  under a same port group set, reporting no more than W2 or W2 reference signal port indexes or no more than W3 or W3 reference signal port group indexes;
  where W2 and W3 are integers greater than or equal to 1.

In the embodiment, the port group set is acquired according to at least one of the following manners: by a predefined rule or by configuration of the second communication node.

In an embodiment, the first type reporting configuration signaling is configured according to at least one of following rules:
only reporting port indexes or reference signal port group indexes under a same port group set; or
precluding reporting port indexes or reference signal port group indexes under different port group sets.

In an embodiment, the predefined rule includes at least one of: constituting one port group set by every F1 port groups in order according to port group indexes, constituting two port group sets by port groups according to odd port group indexes and even port group indexes, or dividing all port groups into F2 port group sets.

F1 and F2 are integers greater than or equal to 1.

In the embodiment, the second communication node configures at least one of F1 or F2.

In an embodiment, the method further includes one of:
receiving association information between subsets in the first type channel state information set and subsets in the second type channel state information set which is reported by the first communication node;
receiving layer information associated with the subsets in the first type channel state information set which is reported by the first communication node; or
receiving layer information associated with the subsets in the second type channel state information set which is reported by the first communication node.

Figure 9:
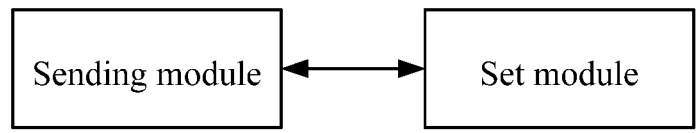
FIG. 9 is a schematic structural diagram of a channel state information receiving apparatus according to an embodiment of the present disclosure.

As shown in FIG. 9, an embodiment of the present disclosure provides a channel state information reporting apparatus which is arranged at a second communication node (a base station end). The apparatus includes a sending module and a set module.

The sending module is configured to send a reference signal to a first communication node.

The set module is configured to receive at least one of a first type channel state information set or a second type channel state information set which is determined by the first communication node according to a first type reporting configuration signaling associated with the reference signal.

The first type channel state information set includes at least one of: a reference signal resource index, a reference signal resource set index, a reference signal resource setting index, a reporting configuration index, a reference signal port group index, a reference signal port group set index, a port index, or rank indicator information.

The second type channel state information set includes at least one of: precoding matrix indicator information, channel quality indicator information, an amplitude coefficient, a phase coefficient, or a reference signal received power.

In conclusion, based on the solution provided by embodiments of the disclosure, a reference signal receiving end is supported to report its own capability, and further the reference signal transmitting end can indicate a beam reporting under a beam grouping or satisfying a user capability. At the same time, a problem of collision between the beam related reporting and the traditional channel state information reporting is solved. Especially for cases of equipment rotation and shielded links, the reference signal receiving end is supported to request the reference signal transmitting end to perform a beam training on partial beam links, thus effectively solving the problem of high-efficiency beam related information reporting under different base station and user capabilities and different scenes.

Although the embodiments disclosed by the present application are as described above, the content thereof is only embodiments for facilitating the understanding of the solutions of the present application and is not intended to limit the present application. Any person skilled in the art to which the present application pertains can make any modifications and changes in the forms and details of the implementation without departing from the solutions disclosed by the present application, but the scope of protection defined by the present application is still subject to the scope defined by the appended claims.

What is claimed is:

1. A channel state information reporting method, applied to a first communication node, wherein the first communication node comprises a user equipment, wherein the method comprises:
receiving a reference signal sent by a second communication node; and
determining, according to a first type reporting configuration signaling associated with the reference signal, at least one of a first type channel state information set or a second type channel state information set, and reporting the at least one of the first type channel state information set or the second type channel state information set to the second communication node, wherein the second communication node comprises a base station;
wherein the first type channel state information set comprises at least one of: a reference signal resource index, a reference signal resource set index, a reference signal resource configuration index, a reporting configuration index, a reference signal port group index, a reference signal port group set index, a port index, or rank indicator information;
wherein the second type channel state information set comprises at least one of: precoding matrix indicator information, channel quality indicator information, an amplitude coefficient, a phase coefficient, or a reference signal received power;
wherein reporting the reference signal resource index is performed according to following rules:
under different reference signal resource configurations, reporting reference signal resource indexes from the different reference signal resource configurations at a same time; and
under a same reference signal resource configuration, reporting no more than U3 or U3 reference signal resource indexes from the same reference signal resource configuration, wherein U3 is an integer greater than or equal to 1; and
wherein the different reference signal configurations correspond to different panels located at the base station.

2. The channel state information reporting method of claim 1, wherein the reference signal comprises N reference signal resource configurations, one of the N reference signal resource configurations comprises M reference signal resource sets, one of the M reference signal resource sets comprises K reference signal resources, and one of the K reference signal resources comprises L reference signal ports;
wherein N, M, K and L are integers greater than or equal to 1.

3. The channel state information reporting method of claim 1, wherein
the first type channel state information set comprises I subsets of the first type channel state information, wherein one of the I subsets comprises at least one of the reference signal resource index, the reference signal resource set index, the reference signal resource configuration index, the reporting configuration index, the reference signal port group index, the reference signal port group set index, the port index, or the rank indicator information; or the second type channel state information set comprises J subsets of the second type channel state information, wherein one of the J subsets comprises at least one of the precoding matrix indicator information, the channel quality indicator information, the amplitude coefficient, the phase coefficient, or the reference signal received power;

wherein I and J are integers greater than or equal to 1.

4. The channel state information reporting method of claim 1, wherein the first type channel state information set comprises at least one of:

reference signal resource set indexes whose quantity is A0;

reference signal resource indexes whose quantity is A1; or reference signal port group indexes whose quantity is A2;

wherein A0, A1 and A2 are integers greater than or equal to 0.

5. The channel state information reporting method of claim 4, wherein the first type reporting configuration signaling configures at least one of following parameters: A0, A1 or A2.

6. The channel state information reporting method of claim 1, wherein the first type channel state information set comprises at least one of:

reference signal resource set indexes whose quantity is at most B0 or reference signal resource set indexes whose quantity is not less than C0;

reference signal resource indexes whose quantity is at most B1 or reference signal resource indexes whose quantity is not less than C1; or reference signal port group indexes whose quantity is at most B2 or reference signal port group indexes whose quantity is not less than C2;

wherein B0, C0, B1, C1, B2 and C2 are integers greater than or equal to 0.

7. The channel state information reporting method of claim 6, wherein the first type reporting configuration signaling configures at least one of following parameters: B0, C0, B1, C1, B2 or C2.

8. The channel state information reporting method of claim 1, wherein the first type reporting configuration signaling configures following parameter: U3.

9. The channel state information reporting method of claim 1, wherein reporting the at least one of the first type channel state information set and the second type channel state information set to the second communication node is performed according to at least one of following rules:

under different reference signal resource sets, reporting port indexes, reference signal port group indexes, reference signal port group set indexes, or reference signal resource indexes under the different reference signal resource sets; or under a same reference signal resource set, reporting no more than V0 or V0 reference signal port indexes, no more than V1 or V1 reference signal port group indexes, no more than V2 or V2 reference signal port group set indexes, or no more than V3 or V3 reference signal resource indexes under the same reference signal resource set;

wherein V0, V1, V2 and V3 are integers greater than or equal to 1.

10. The channel state information reporting method of claim 9, wherein the first type reporting configuration signaling configures at least one of following parameters: V0, V1, V2 or V3.

11. The channel state information reporting method of claim 1, wherein reporting the at least one of the first type channel state information set and the second type channel state information set to the second communication node is performed according to at least one of following rules:

only reporting port indexes, reference signal port group indexes, reference signal port group set indexes, or reference signal resource indexes under a same reference signal resource set; or precluding reporting port indexes, reference signal port group indexes, reference signal port group set indexes, or reference signal resource indexes under different reference signal resource sets.

12. A channel state information receiving method, applied to a second communication node, wherein the second communication node comprises a base station, wherein the method comprises:

sending a reference signal to a first communication node; and receiving at least one of a first type channel state information set or a second type channel state information set which is determined by the first communication node according to a first type reporting configuration signaling associated with the reference signal, wherein the first communication node comprises a user equipment;

wherein the first type channel state information set comprises at least one of: a reference signal resource index, a reference signal resource set index, a reference signal resource configuration index, a reporting configuration index, a reference signal port group index, a reference signal port group set index, a port index, or rank indicator information;

wherein the second type channel state information set comprises at least one of: precoding matrix indicator information, channel quality indicator information, an amplitude coefficient, a phase coefficient, or a reference signal received power;

wherein the first type reporting configuration signaling is configured according to following rules:

under different reference signal resource configurations, reporting reference signal resource indexes from the different reference signal resource configurations at a same time; and under a same reference signal resource configuration, reporting no more than U3 or U3 reference signal resource indexes from the same reference signal resource configuration, wherein U3 is an integer greater than or equal to 1; and wherein the different reference signal configurations correspond to different panels located at the base station.

13. The channel state information receiving method of claim 12, wherein the first type channel state information set comprises at least one of:

reference signal resource set indexes whose quantity is A0;

reference signal resource indexes whose quantity is A1; or reference signal port group indexes whose quantity is A2;

wherein A0, A1 and A2 are integers greater than or equal to 0.

14. The channel state information receiving method of claim 12, wherein the first type channel state information set comprises at least one of:

reference signal resource set indexes whose quantity is at most B0 or reference signal resource set indexes whose quantity is not less than C0;

reference signal resource indexes whose quantity is at most B1 or reference signal resource indexes whose quantity is not less than C1; or reference signal port group indexes whose quantity is at most B2 or reference signal port group indexes whose quantity is not less than C2;

wherein B0, C0, B1, C1, B2 and C2 are integers greater than or equal to 0.

15. A channel state information reporting apparatus, provided at a first communication node, wherein the first communication node comprises a user equipment, wherein the apparatus comprises:

a processor;

a memory for storing processor-executable instructions; wherein the processor is configured to:

receive a reference signal sent by a second communication node; and determine, according to a first type reporting configuration signaling associated with the reference signal, at least one of a first type channel state information set or a second type channel state information set, and report the at least one of the first type channel state information set or the second type channel state information set to the second communication node, wherein the second communication node comprises a base station;

wherein the first type channel state information set comprises at least one of: a reference signal resource index, a reference signal resource set index, a reference signal resource configuration index, a reporting configuration index, a reference signal port group index, a reference signal port group set index, a port index, or rank indicator information; and wherein the second type channel state information set comprises at least one of: precoding matrix indicator information, channel quality indicator information, an amplitude coefficient, a phase coefficient, or a reference signal received power;

wherein the processor is configured to report the reference signal resource index according to following rules:

under different reference signal resource configurations, reporting reference signal resource indexes from the different reference signal resource configurations at a same time; and under a same reference signal resource configuration, reporting no more than U3 or U3 reference signal resource indexes from the same reference signal resource configuration, wherein U3 is an integer greater than or equal to 1; and wherein the different reference signal configurations correspond to different panels located at the base station.

16. A channel state information receiving apparatus, provided at a second communication node, comprising a processor and a memory for storing computer-readable instructions that when executed by the processor cause the processor to perform the channel state information receiving method of claim 12.

\* \* \* \* \*